3,674,596
METHOD OF LAMINATING UNTREATED WOOD TO WOOD TREATED WITH FIRE RETARDANT MATERIAL
Lawrence O. McMinimy, Lewiston, Idaho, assignor to Potlatch Forests, Inc., San Francisco, Calif.
No Drawing. Filed Mar. 23, 1970, Ser. No. 22,045
Int. Cl. C09j 5/06
U.S. Cl. 156—321                                    4 Claims

ABSTRACT OF THE DISCLOSURE

A method of laminating lumber wherein an outer layer in the laminated assembly is treated with a fire retardant salt solution. The laminating process involves pre-heating of the surfaces to be bonded, the application of a thermosetting adhesive to the untreated surface, and immediate application of pressure to hold the surfaces in intimate contact during substantial curing of the adhesive. The resulting product has particular structural and practical features which are attributed to the method.

BACKGROUND OF THE INVENTION

This disclosure relates to the bonding of lumber that has been treated with a fire retardant salt solution. Many types of such solutions are commercially available and accepted today. However, considerable difficulty has been recognized in bonding or laminating lumber having the fire retardant treatment. In most instances, the effectiveness of a conventional adhesive used in the lumber industry is seriously reduced by the introduction of such chemicals into the wood to be bonded.

In manufacturing a laminated wood product wherein a fire retardant property is desired, one may either glue the lumber first and subsequently treat it with the fire retardant, or glue the wood components after having previously impregnated them with the fire retardant. It has been recognized that gluing of the untreated wood and subsequent treatment of the entire laminated assembly results in the best products with the fewest production problems. This approach is most prevalent today in the manufacture of fire retardant plywood and laminated beams. However, its use is limited by the practical difficulty of size limitations and by the added cost of impregnating the entire volume of large structural members. In many applications, as will be discussed below, it is not necessary that the entire product be impregnated with the fire retardant salt. In fact, there are considerable advantages to be gained by having only one surface so treated.

Recognized incompatability between adhesives and fire retardants results from several causes. Most adhesives polymerize to produce a good bond within a narrow range of pH, this range being specific to each adhesive. Commercial fire retardants are mixtures of chemicals which act as buffers and which vary the pH value of the adhesive applied to such materials. Also, commercial fire retardants as used today are hygroscopic, and result in the wood having higher moisture contents than untreated lumber under similar conditions. Extra precautions must be taken to insure that the fire retardant treated wood is at a suitable moisture content prior to bonding.

Reported results on bonding of fire retardant lumber show erratic results, varying from one adhesive to another and from one retardant to another. Weak bonds often result and the curing of the adhesive is slowed by the salts present in the wood. The bonded joints have been found to often be of lower strength than matching specimens of untreated wood. The percentages of wood failure is often lower in treated specimens. In many prior reports, substandard results have also been obtained when treated wood is bonded to untreated wood layers. Cohesive failure has been found to be more frequent at the treated face than at the untreated face.

As disclosed below, this invention is based on the discovery that structurally acceptable bonds can be produced between adjacent layers of treated and untreated lumber by using pre-heat techniques, and immediately applying bondings pressure to the heated surfaces after application of a thermosetting adhesive. This process greatly reduces the time required for bonding, and eliminates much of the difficulty in adhesive use which could be attributed to contact of the treatment salts and adhesive. The method has been proven to result in adhesive bonds substantially equal in strength to those produced by the lamination of untreated boards.

SUMMARY OF THE INVENTION

The invention comprises a method of producing a laminated wood product having two lumber layers bonded along abutting surfaces, one layer being previously treated with a commercial fire retardant solution. The method involves heating the surfaces to temperatures above that required for curing of the laminating adhesive, the application of a thermosetting adhesive to the untreated surface, and the immediate positioning of the surfaces in intimate contact under bonding pressure so as to substantially cure the laminating adhesive by use of the heat energy stored within the surfaces. The present invention further relates to the product resulting from use of this process.

It is a first object of this invention to provide a commercially acceptable manufacturing method for laminating lumber products wherein one layer is treated with a commercial fire-retardant.

Another object of the invention is to reduce the time otherwise necessary for bonding laminated wood products having fire retardant treated layers.

Another object of the invention is to provide a unique laminated lumber product having one layer that is fire-retardant treated and being particularly designed for structural applications in building assemblies.

These and further objects will be evident from the following disclosure, which discusses the general features of the novel method and product, together with specific examples which have been proven to be commercially acceptable.

BRIEF DESCRIPTION OF THE PREFERRED EMBODIMENT

This disclosure relates to the bonding of lumber to form laminated beams or wood products having fire-retardant treated layers bonded to untreated layers. The treated layers may be provided at one or both exterior surfaces of the laminated product. As examples, a product might be in the form of a laminated beam having two or more parallel layers of boards of equal dimensions, the boards being end-glued to form a beam of the desired length. The product might also comprise laminated boards wherein each layer includes a plurality of boards which are also edge-glued and which overlap the boards of adjacent layers, as used in decking and flooring. The product might comprise small dimension lumber laminated to produce the equivalent of larger dimension boards, such as of two 1 x 4's bonded to produce a 2 x 4. It also might be in the form of a three layer product formed from three equal boards with the center layer offset to produce a tongue and groove configuration in the resulting laminated member. In such laminated members having two layers, one layer is fire-retardant treated and the other would be untreated.

In members having three or more laminated layers, one or both exterior layers are fire-retardant treated, depending upon the type of protection desired in the structural application of the member. In most structural applications, fire-retardant protection is required in only one direction, and generally only one layer need be treated for effective use of the fire-retardant properties.

To produce an acceptable laminated product, one face ply is first pressure treated with commercial fire retardant salts. The remaining plies are not treated. Properly sized and graded lumber for the face ply is treated by known methods, using commercially available fire-retardant salt solutions. The treated lumber is received for lamination in either a dry condition or a wet condition. If wet, it must be dried prior to use. After the lumber has been treated and dried, one side of the treated boards is lightly surfaced by use of an abrasive sander belt or equivalent mechanical device, resulting in a clean, even surface for gluing purposes.

The material is then directed into a laminating apparatus, which can be a continuous laminator or a batch laminator. In the laminator, the boards are subjected to pre-heating of the surface to be bonded. This continues for a period sufficient to raise the surface temperature above the range of bonding temperatures specified by the adhesive manufacturer, but below that at which the wood surfaces char. Adhesive is then spread on the hot untreated surface opposing those that are fire-retardant treated and the boards are immediately directed to a press where the boards are maintained under pressure during substantial curing of the adhesive by the heat stored within the board surfaces.

Many types of fire-retardant solutions are now commercially available. Two specific products that have been used successfully in the present process are "Osmose Flameproof" sold by the Osmose Wood Preserving Company of America, Inc., Buffalo, N.Y. and "Non-Com" produced by the Koppers Company. While the specific formulas for such products are trade secrets of the manufacturers, both are identifiable as a "Type C" fire retardant treatment under the standards for fire retardant formulations of the American Wood Preservers Association, Standard P10–68. "Type C" includes materials having the following formulation:

| | Percent |
|---|---|
| Diammonium phosphate—$(NH_4)_2HPO_4$ | 10 |
| Ammonium sulfate—$(NH_4)SO_4$ | 60 |
| Sodium tetraborate, anhydrous—$NA_2B_4O_7$ | 10 |
| Boric acid—$H_3BO_3$ | 20 |

In treating lumber, the fire-retardant salts available commercially are dissolved in water to normally arrive at a 15% solution of the salt by weight. The salts are then impregnated into the lumber by pressure, using conventional equipment and techniques.

Other types of fire-retardant solutions may be used in accord with this disclosure. They may include the chemicals outlined above or other chemicals used in the industry. However, experimentation to date has shown that the process does not produce the desired effective bond if the fire-retardant treatment salts include zinc chloride or chromated salts, such as sodium chromate.

The laminating apparatus may be of any available construction for continuous lamination of lumber or batch lamination of beams or other large structural members. Examples of equipment and processes for laminating boards using pre-heat techniques are shown in U.S. Pats. 2,919,732 and 2,729,584. No further details relating to such equipment or process is believed necessary for an understanding of the present disclosure.

Various adhesives may be utilized in the present process. In general, laminating adhesives for lumber are classified as being interior or exterior, depending upon whether the adhesives are waterproof or not. The exterior adhesives include phenolics, resorcinols, and melamine. Interior adhesives include ureas and blood and soybean derivatives.

Any suitable thermosetting adhesive may be utilized, it being necessary to adjust the pre-heat surface temperatures of the boards and the application of pressure to meet the requirements of the adhesive.

A specific example of a suitable adhesive which has been used in conjunction with boards treated by the "Type C" fire retardant salts is a melamine-urea-formaldehyde adhesive sold under the designation "Melurac Resin 400" by the Americal Cyanamid Company of Wallingford, Conn. The manufacturer's designated curing range for this resin is indicated to be at platen temperatures ranging from 220 degrees F. to 280 degrees F., using conventional heating methods.

To fully described one specific application of the method to produce a fire-retardant treated laminated product, one can utilize the method in the production of three ply laminated lumber where the plies or layers are all parallel and aligned edge to edge, or where the center ply is offset slightly from the two outer plies, producing a resulting tongue and groove configuration.

The face ply is first pressure treated with fire retardant salts, the other plies being untreated. A specific example of the salts which has been successfully used is the "Osmose Flameproof" treatment generally designated as a "Type C" fire-retardant formulation. The treated lumber is then dried to a moisture content compatible with the adhesive to be used and the method of lamination. One side of the treated lumber is sanded to produce a clean and even surface free of exterior salt accumulation.

The three layers are then directed to a laminator where the opposed surfaces of adjacent parallel boards are heated to a surface temperature between 330 degrees F. to 360 degrees F. The heated surfaces are immediately directed to a glue spreader, where the untreated surfaces adjacent to those that are treated have an adhesive applied thereto. It has been found best to not apply the adhesive to the fire-retardant treated surfaces. An adhesive, such as "Melurac Resin 400" is applied to the untreated surfaces and the layers are immediately subjected to pressure perpendicular to the glue line, bringing the surfaces into intimate contact prior to curing of the adhesive. Pressure is maintained on the boards until an effective bond has been created by substantial curing of the adhesive.

For best results, I have found that the time between application of adhesive and the application of bonding pressure must be less than 60 seconds, and preferably is less than 30 seconds. In any event, bonding must take place prior to curing or polymerization of the adhesive resin. By applying the adhesive to the untreated wood surfaces, contamination of the adhesive prior to curing is minimized, since curing of the adhesive begins immediately upon contact of the heated surfaces and adhesive.

The resulting product produced by this method has a treated face and an untreated center layer. It has been found to have better glue bonds than have been experienced where all layers of the same product are treated with fire retardant salts. Furthermore, the treatment of less than all layers reduces the cost of the finished product. For roof or ceiling applications, a fire-retardant treated face directed toward the inside of the building provides effective protection to the occupants and contents of the building, since the probability of flame damage is greatest on surfaces facing the inside of a building. Protection against flame damage is as effective by treatment of a single face in such an application as by treating all laminations.

Furthermore, the treated laminated product has advantages over a treated solid product of the same dimensions. The laminations can be uniformly controlled as to moisture content for improved stability. A better appearance is available, since the laminated product has less tendency to crack or warp. The product is cleaner to handle, since only one face has any treatment applied to it and all other surfaces are free of exterior salts or chemical accumulations.

In conclusion, the above process and product have been effective in applying available fire-retardant treatments to laminated products to gain the most effective use of the fire-retardant properties in building construction. Minor changes might be made in the process or resulting product as necessary to adapt them to a particular application or to existing machinery for the various process steps. For these reasons, only the following claims are set out as definitions of the invention.

Having thus described my invention I claim:

1. A method of producing a laminated wood product from two boards, one of which has been treated by application of a fire-retardant salt solution not containing zinc chloride or chromated salts and the other being untreated, comprising the following steps:

heating opposed surfaces of the two boards to a surface temperature above that required to cure the laminating adhesvie;

applying to the heated surface of the untreated board a quantity of thermosetting adhesive;

bringing the heated surfaces of the two boards into contact with one another under pressure perpendicular to said surfaces while the respective surfaces remain at a temperature above that required to cure the adhesive and prior to curing of the adhesive;

and holding the boards under pressure perpendicular to said surfaces for a duration of time adequate to effect bonding of the surfaces by curing of the adhesive.

2. A method as set out in claim 1 wherein the adhesive is a melamine-urea-formaldehyde exterior waterproof adhesive and wherein the board surfaces are heated to a temperature range of 330 degrees F. to 360 degrees F. and wherein the surfaces are brought into contact within 60 seconds after adhesive application.

3. A method of producing a fire-retardant treated composite wood product having at least two bonded layers, comprising:

applying a fire-retardant salt solution not containing zinc chloride or chromated salts to at least one layer;

resurfacing a surface of said one layer;

heating said surface of said one layer and a surface of an untreated second layer;

applying a thermosetting adhesive to the heated surface of the second layer;

abutting the heated surfaces of said first and second layers prior to polymeriaztion of the applied adhesive;

and subjecting the first and second layers to pressure directed perpendicularly to the heated surfaces during polymerization of the adhesive.

4. A method as set out in claim 1 wherein the thermosetting adhesive is a melamine-urea-formaldehyde exterior waterproof adhesive.

References Cited

UNITED STATES PATENTS

| | | | |
|---|---|---|---|
| 3,036,947 | 5/1962 | Marra | 156—321 |
| 3,498,877 | 3/1970 | Christoffersen et al. | 117—138 X |
| 3,137,607 | 6/1964 | Goldstein et al. | 161—403 X |
| 2,919,732 | 1/1960 | McKean et al. | 156—304 X |
| 2,729,584 | 1/1956 | Foster | 156—322 X |
| 2,344,488 | 3/1944 | Bowling | 156—304 |
| 3,488,310 | 1/1970 | McCombs | 156—331 X |

BENJAMIN R. PADGETT, Primary Examiner

R. L. TATE, Assistant Examiner

U.S. Cl. X.R.

156—153, 322, 331; 161—403